May 5, 1925.
H. VANDERBEEK
VEHICLE BRAKE
Filed May 20, 1921
1,536,640
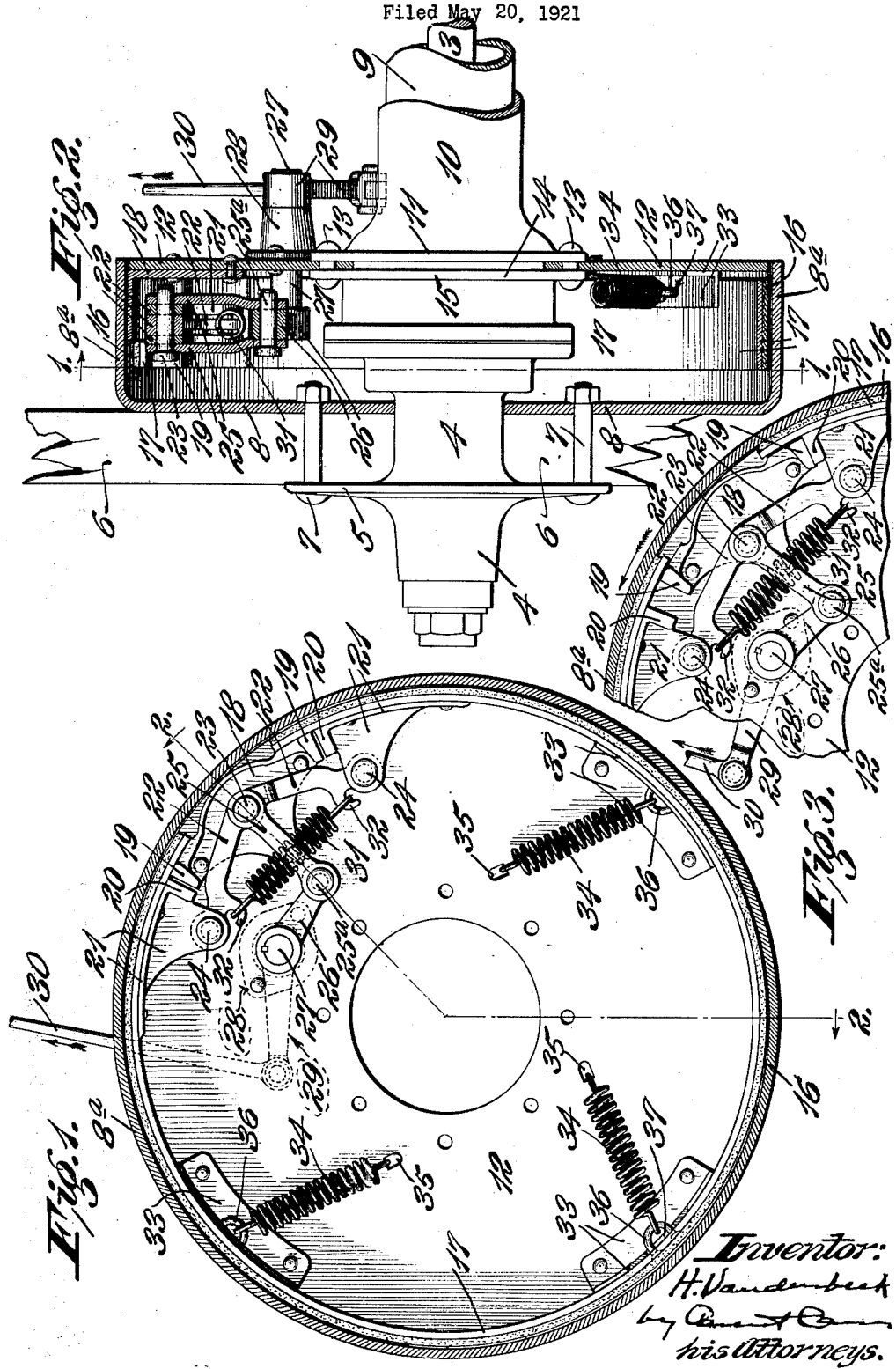
Inventor:
H. Vanderbeek
by
his Attorneys.

Patented May 5, 1925.

1,536,640

UNITED STATES PATENT OFFICE.

HERBERT VANDERBEEK, OF DETROIT, MICHIGAN, ASSIGNOR TO THE TIMKEN-DETROIT AXLE COMPANY, OF DETROIT, MICHIGAN, A CORPORATION OF OHIO.

VEHICLE BRAKE.

Application filed May 20, 1921. Serial No. 471,143.

*To all whom it may concern:*

Be it known that I, HERBERT VANDERBEEK, a citizen of the United States, and a resident of the city of Detroit, in the county of Wayne and State of Michigan, have invented a new and useful Improvement in Vehicle Brakes, of which the following is a specification.

This invention relates to internal band brakes of the toggle-operated type particularly adapted for use in connection with wheels of motor vehicles.

One of the principal objects of the present invention is to provide a simple and efficient construction whereby the force transmitted by the toggle joint is applied to the ends of the brake band in directions that are substantially parallel with tangents to the portions of the drum that are opposite said ends, whereby the engagement of said brake band with said drum is rendered more positive and a more effective braking action is secured. Another object is to provide means for breaking the toggle upon release of the brake operating lever. Other objects are to simplify the construction, to reduce the cost of manufacture and to facilitate assembling.

The invention consists principally in the novel arrangement of the toggle for spreading the ends of the brake band and in the means for automatically returning said toggle to its released position. The invention further consists in the parts and combinations of parts hereinafter described and claimed.

In the accompanying drawing, which forms part of this specification, and wherein like symbols refer to like parts wherever they occur, Fig. 1 is a cross-section through a brake drum on the line 1—1 in Fig. 2, a brake actuating mechanism embodying my invention being shown in connection therewith;

Fig. 2 is an axial section through said drum on the line 2—2 in Fig. 1, the adjacent parts of the axle being shown in elevation; and Fig. 3 is a fragmentary section similar to Fig. 1, showing the positions of the parts when the brake is applied.

For purposes of illustration, my invention is shown in connection with a well known type of automobile axle construction which comprises a driving shaft section 3 having a wheel-hub member 4 secured to the outer end thereof. The hub is provided with a circumferential flange 5; and the wheel spokes 6 are clamped by means of bolts 7 between said flange 5 and a brake drum 8 which is provided with a central circular opening through which projects the inner end portion of said hub.

The drive shaft 3 is enclosed in a tubular axle housing 9 having a tubular extension 10 suitably secured thereto. The extension 10 is provided at its outer end with a circumferential flange 11; and a brake disk or shield 12 is firmly clamped by means of rivets 13 between said flange 11 and a similar flange 14 on a bearing housing 15 that encloses the anti-friction bearings (not shown) for the outer end of the drive shaft.

The brake drum is provided with a circular brake flange $8^a$ whose inner surface is adapted to be frictionally engaged by the brake lining material 16 of a split semi-flexible metallic band 17. The brake band is held from rotating with the brake drum by an anchor bracket 18, which is riveted or otherwise secured to the stationary brake shield 12 at the gap between the adjacent ends of the brake band. The anchor bracket 18 is provided with abutment flanges 19 adapted to be engaged by abutment flanges 20 of end fittings 21 which are rigidly secured to the end portions of the brake band 17 by riveting.

The adjacent ends of the brake band are loosely connected by means of a toggle or elbow joint comprising a pair of toggle links 22 which have their adjacent ends pivotally connected by means of a pivot pin 23 and have their other ends pivotally connected by means of pivot pins 24 to the end fittings 21. The toggle links are disposed with their point of junction offset outwardly from the center of the axle with respect to their points of connection with said end fittings. Actuating links 25 are disposed one on each side of the toggle links 22 and have one end pivotally connected to said toggle links 22 at their point of junction. The opposite ends of said links 25 are pivotally secured by a pivot pin $25^a$ to the free end of a rock lever 26, which is fixed to the outer end of a rock shaft 27 journaled in a bracket 28 riveted or otherwise rigidly secured to the shield 12. A lever 29 is attached to the inner end of the rock shaft 27, and a pull rod 30, which is adapted to be extended forward to the brake pedal (not shown), is pivotally secured to the free end of said lever 29.

The toggle is normally held in an open position by means of a contracting coil spring 31, whose ends are secured to hooks 32 formed integral with the links 22 near the points where said links are pivotally secured to the end fittings. The hook portions 32 of the links are offset inwardly from the centers of the pins 24 towards the center of the axle, whereby the spring 31 serves to hold the toggle normally in its bent position and the ends of the brake band clear of the brake drum. This spring serves also as means for taking up any looseness in the pivot connections, thereby eliminating rattle and noise resulting therefrom.

At points intermediate its ends, the brake band is held out of contact with the brake drum and against a plurality of stop brackets 33 by means of a plurality of contracting coil springs 34. The stop brackets 33 are of angle section and have one flange secured to the inner face of the shield 12. The other flanges of said stop brackets are shaped to conform to the curvature of the brake band, which, in its contracted position, is held against said curved flanges by the springs 34. One end of each spring is hooked into a hole 35 in the shield 12, and the other end thereof is fastened to a U-shaped fastener 36 which projects inwardly from the brake band and is riveted thereto. These fasteners extend through elongated slots 37 formed in the curved flanges of the stop brackets, whereby the springs are permitted to draw the brake band against said curved flanges, said slots being of a length sufficient to permit the necessary movement of the band lengthwise of the curved flanges. These springs 34, together with the toggle spring 31, serve to hold the band normally clear of the rotating brake drum.

Assuming the parts to be in the positions indicated in Fig. 1 the operation is as follows:

The operator in applying the brake causes the pull rod to move in the direction indicated by the arrows, thereby rotating the lever 29. This action rotates the rock shaft 27 and causes the rock arm 26 fixed thereto to swing inwardly towards the center of the axle. This swinging movement of the rock arm 26, by reason of the link connections 25 between said arm and the point of junction of the toggle links 22, causes the elbow of the toggle to move inwardly towards the center of the axle, which action tends to straighten said links. The straightening of the links produces an endwise pressure which, by reason of the pivotal connections between said links and the end fittings is applied to the ends of the band in directions substantially parallel with tangents to the portions of the drum which are opposite said ends of said band respectively. This action spreads the ends of the brake band, thereby forcing said band outwards against the inner periphery of the brake drum. When the brake band is pressed against the rotating drum during the forward movement of the vehicle, (at which time said drum will be rotating in the direction indicated by the arrow in Fig. 3), the entire brake band, by reason of its frictional engagement with the brake drum, will rotate with said drum until the abutment flange 20 of the lowermost end fitting 21 strikes the adjacent abutment flange 19 of the anchor bracket 18. Further straightening of the toggle links forces the loose end of the band more firmly against the drum. When the toggle is operated during the backward movement of the vehicle, a similar action takes place except that the abutment flange of the uppermost end fitting is forced against the uppermost abutment flange of the anchor member.

When the brake is released, the spring 31 breaks the toggle and draws the end fittings towards each other, thereby contracting the brake band and drawing the loose ends thereof away from the drum, the intermediate portion of the band being drawn away from the drum by the springs 34.

One of the important advantages of the above described construction is that a great endwise pressure is directed against the ends of the brake band in directions that are substantially perpendicular to the radii of the drum passing through said ends, whereby a more effective braking action is obtained. Another important advantage is that the spring which breaks the toggle, serves also as a means for contracting the end of the brake band and as a means for taking up lost motion in the toggle pivots.

It is evident that numerous changes may be made without departing from the invention; therefore, I do not wish to be limited to the precise construction shown and described.

What I claim is:

1. A brake drum, a brake band adapted to frictionally engage said drum to retard the movement thereof, a stationary stop member adapted to cooperate with an end of said band in the engaged position thereof, a toggle joint operatively connected to the ends of said band for moving the same into and out of engagement with said drum, said toggle joint being disposed with its elbow offset outwardly from its points of connection with said band and with its points of connection with said band located inwardly from the inner peripheral surface of said band, and a spring device operatively engaging the ends of said toggle joint at points offset inwardly from the points of connection of said toggle with said band towards the center of said drum.

2. A hollow brake drum, a circumferentially expansible split brake band within said drum and adapted when expanded to frictionally engage the inner surface of said drum, a stationary stop member adapted to be engaged by an end of said band in the expanded position thereof, a toggle joint for expanding and contracting said band, said toggle joint comprising a pair of toggle links pivotally secured together and having their ends pivotally secured to the ends of said brake band, said links being disposed with their point of junction offset outwardly from their points of connection with the said brake band, whereby said toggle links act against the ends of the brake band in directions substantially parallel with tangents to said drum at said ends of said brake band respectively, and a contracting spring having its ends connected to the ends of said links adjacent to their points of connection with said brake band at points offset inward from said points of connection towards the center of said drum, whereby said toggle is normally maintained in an inoperative position and said brake band is held in its contracted position with its ends clear of the drum.

3. A hollow brake drum, a circumferentially expansible split brake band within said drum and adapted when expanded to frictionally engage the inner surface of said drum, means for normally holding the intermediate portion of said band clear of said drum, abutment members fixed to the ends of said band, a stationary abutment disposed between the open ends of said band and adapted to be engaged by the abutment members thereof, a toggle joint for expanding and contracting said band, said toggle comprising a pair of pivotally connected links, one of said links being pivotally connected to the abutment member at one end of the band and the other link being pivotally connected to the abutment member at the other end of said band, said links being disposed with their point of junction offset outwardly from the center of said drum with respect to their points of connection with said abutment members, and a spring connecting the ends of said links at points offset inwardly from the center of said drum with respect to their points of connection with said abutment members.

4. A hollow brake drum, a circumferentially expansible split brake band within said drum and adapted when expanded to frictionally engage the inner surface of said drum, abutment members fixed to the ends of said band, a stationary abutment disposed between the open ends of said band and adapted to be engaged by the abutment members thereof, a toggle joint for expanding and contracting said band, said toggle joint comprising a pair of pivotally connected links, one of said links being pivotally connected to the abutment member at one end of the band and the other link being pivotally connected to the abutment member at the other end of said band, said links being disposed with their point of junction offset outwardly from the center of said drum with respect to their points of connection with said abutment members, said links having hook portions located adjacent to their points of connection with said abutment members and offset inwardly from said points towards the center of said drum, and a contracting spring having its ends connected to said hook portions of said links.

5. A hollow brake drum, a circumferentially expansible split brake band within said drum and adapted to frictionally engage the inner surface of said band, a stationary stop bracket disposed between the open ends of said band and adapted to be engaged on opposite sides by the ends thereof, a toggle joint operatively connecting the ends of said brake band, said toggle being disposed with its elbow on one side of a line joining its points of connection with said band and having hook portions disposed on the opposite side of said line, the hook portions being located on the side nearest the center of said drum, and a spring having its ends connected to the hook portions of said toggle and adapted to normally hold the same in inoperative position.

Signed at Detroit, Michigan, this 16 day of May, 1921.

HERBERT VANDERBEEK.